(12) United States Patent
Arns

(10) Patent No.: US 7,290,811 B1
(45) Date of Patent: Nov. 6, 2007

(54) BUMPER STRUCTURE

(75) Inventor: Wilhelm Arns, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 11/689,071

(22) Filed: Mar. 21, 2007

(30) Foreign Application Priority Data

Mar. 20, 2006 (DE) .................. 10 2006 013 274

(51) Int. Cl.
*B60R 19/24* (2006.01)
(52) U.S. Cl. ........................... 293/133; 293/133
(58) Field of Classification Search ............... 293/132, 293/133, 155, 154
See application file for complete search history.

(56) References Cited

U.S. PATENT DOCUMENTS 5,306,056 A * 4/1994 Vogelgesang .............. 293/121
7,188,877 B2 * 3/2007 Gonzalez et al. .......... 293/133

FOREIGN PATENT DOCUMENTS

DE 199 59 701 A1 6/2001

* cited by examiner

*Primary Examiner*—Joseph D. Pape
(74) *Attorney, Agent, or Firm*—Henry M. Feiereisen; Ursula B. Day

(57) ABSTRACT

A bumper structure for the front and rear area of a motor vehicle includes a bumper cross member and a crash box which is placed between the cross member and an end of a side rail. The crash box is configured in the form of a hollow body made of two sheet-metal shells which overlap one another in an overlap zone and are interconnected, at least in sections thereof, through material union. The cross member is detachably secured to the crash box by a bolted connection having at least one bolt which extends in upright direction of the motor vehicle and is arranged in the overlap zone of the crash box. Force introduction from the cross member into the crash box is hereby improved.

14 Claims, 2 Drawing Sheets

BUMPER STRUCTURE

CROSS-REFERENCES TO RELATED APPLICATIONS

This application claims the priority of German Patent Application, Ser. No. 10 2006 013 274.2, filed Mar. 21, 2006, pursuant to 35 U.S.C. 119(a)-(d), the content of which is incorporated herein by reference in its entirety as if fully set forth herein.

BACKGROUND OF THE INVENTION

The present invention relates, in general, to a bumper structure for a motor vehicle.

Nothing in the following discussion of the state of the art is to be construed as an admission of prior art.

A bumper structure is mounted to the front or rear of a motor vehicle to convert generated impact energy into deformation work, in the event of a frontal or rear impact with a road user or in the event of a collision with an obstacle, so as to prevent or minimize damage to vehicle components, in particular the chassis, and thus to limit the amount of damage. In addition, a bumper structure is provided to assist in the stiffening of the vehicle chassis. Since bumper structures should also be as lightweight as possible, complex constructions have been proposed to reconcile these seemingly contradictory functions. However, for a number of reasons, the various proposals lead only to compromises that are endowed with drawbacks and shortcomings relating for example to manufacturing techniques or to the effect that is hoped to be obtained but cannot always be realized.

It would therefore be desirable and advantageous to provide an improved bumper structure which obviates prior art shortcomings and which is lightweight while still ensuring high stability in an attachment zone between a crash box and a bumper cross member and allowing production in a simple manner.

SUMMARY OF THE INVENTION

According to one aspect of the present invention, a bumper structure for the front and rear area of a motor vehicle includes a bumper cross member, a crash box placed between the cross member and an end of a side rail, with the crash box configured in the form of a hollow body made of two sheet-metal shells overlapping one another in an overlap zone and interconnected, at least in sections thereof, through material union, and a bolted connection for detachably securing the cross member to the crash box, with the bolted connection having at least one bolt which extends in upright direction of the motor vehicle and is arranged in the overlap zone of the crash box.

The present invention resolves prior art problems by providing a bolted connection in the overlap zone of the crash box. This may involve one or more bolted connections.

According to another feature of the present invention, the shells of the crash box overlap one another in two overlap zones which are disposed in opposite relationship, with the bolt of the bolted connection sized long enough to extend through the overlap zones. Of course, it may also be conceivable to substitute the long bolt by two bolts that are smaller in length so that each bolted connection then has two bolts. Currently preferred is however the provision of a bolt of sufficient length to extend through the opposing overlap zones of the crash box because the force can be introduced more evenly into the crash box and the pressure on the wall of the hole is the same in the entire attachment zone.

An essential feature of the present invention is the formation of an overlap, i.e. a doubling of material, in an attachment zone between crash box and the cross member, i.e. area which is traversed by the bolt. As a result of the material doubling, impact forces that are introduced by the bolted connection into the crash box are transmitted directly and simultaneously via the wall of the hole into the shells. This has the advantage of spreading the load in the area traversed by the bolt to both shells so that deformation of the shells is encountered only when the shells are subjected to a much greater force. In addition, the material doubling also results in a decrease of the pressure on the wall of the hole in the overlap zone.

The invention makes it now possible to manufacture crash boxes of relatively thin-walled metal sheets which have a sufficient wall thickness in their attachment zone to the cross member as a consequence of the overlapping zones so that introduced stress can be transferred into the crash box. Thus, the crash box can be manufactured in a simple manner and of lightweight construction while still exhibiting high stability in the attachment zone of the cross member.

A crash box configured in accordance with the invention is also of advantage when, in the event of a collision, the crash-distal crash box has to absorb impact forces that have been transmitted via the cross member but still should remain undamaged. In this case, it is important that no damage is encountered in the attachment zones between the cross member and the crash box. This can be attained by a doubling of material in the overlap zone and the resultant decrease in pressure to which the wall of the hole is subjected.

The overlap zones can be configured in the form of opposing flanges which embrace an attachment zone of the cross member. The flanges are easy to produce through use of a suitable sheet-metal blank before shaping the blank to the sheet-metal shells. Suitably, the shells overlap one another entirely in an area of the flanges. As a result, a substantially same stress pattern can be realized for both shells in the area of the flanges.

According to another feature of the present invention, the overlap zone defines a width which is measured transversely to a travel direction of the motor vehicle and varies along the length extension of the crash box. Currently preferred is an increase in width of the overlap zone of the shells from the end of the side rail in the direction to the cross member. The width of the overlap zone in the area of the cross member may hereby be at least twice the width of the overlap zone in an area of the side rail. The considerable change in width enables a stress pattern that is substantially even and an optimal force introduction into the crash box constructed as hollow body. Despite the change in width along the length, it is, of course, also conceivable to maintain the width of the overlap zone constant in a length section disposed adjacent to the side rail and to provide a transition, extending from the length section to the flanges, wherein a width of the transition continuously increases to a width of the flanges. The length section may hereby have a length which is greater than a length of the transition. As a result, the change in width is substantial in the shorter transition zone.

The shells may be connected in many ways, e.g. through a welding operation, such as spot welding, seam welding, or laser welding. This type of connection by material union is beneficial, when provided continuously or intermittently along a straight line which extends in longitudinal direction of the crash box. Rectilinear welding is much easier to implement compared to two-dimensional welding. Rectilinear welding with interruptions may be realized by sequential execution of spot welding. Continuous joining processes can be realized e.g. by seam welding or laser welding.

The course of the straight line is determined by the position of the overlap zones. Suitably, the straight line extends up to the flanges and extends in an area of the flanges between the bolts disposed in parallel spaced-apart relationship so that one bolt is positioned on one side of the straight line and the other bolt is positioned on the other side of the straight line. A connection of the flanges through material union only in the area of the straight line is sufficient when the bolted connection ensures enough integrity of the remaining overlap zone. As the bolted connection normally brace the flanges against the cross member, the overlap zones rest firmly upon the attachment zone of the cross member so that the need for a large-surface welding of the flanges, e.g. welding along the edges, is eliminated.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
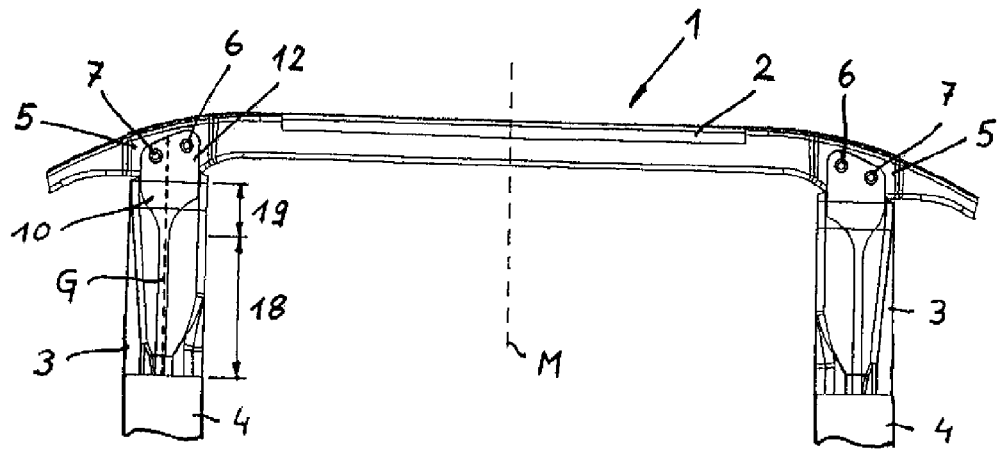
FIG. 1 is a top plan view of a bumper structure according to the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "Bumper Structure".

Turning now to the drawing, and in particular to FIG. 1, there is shown a top plan view of a bumper structure according to the present invention, generally designated by reference numeral 1 and placed across a front or rear of an unillustrated motor vehicle. The bumper structure 1 includes a bumper cross member 2 which is mounted to spaced-apart crash boxes 3, respectively disposed at the ends of side rails 4 of the motor vehicle. The side rails 4 are not shown in greater detail for sake of simplicity.

Figure 2:
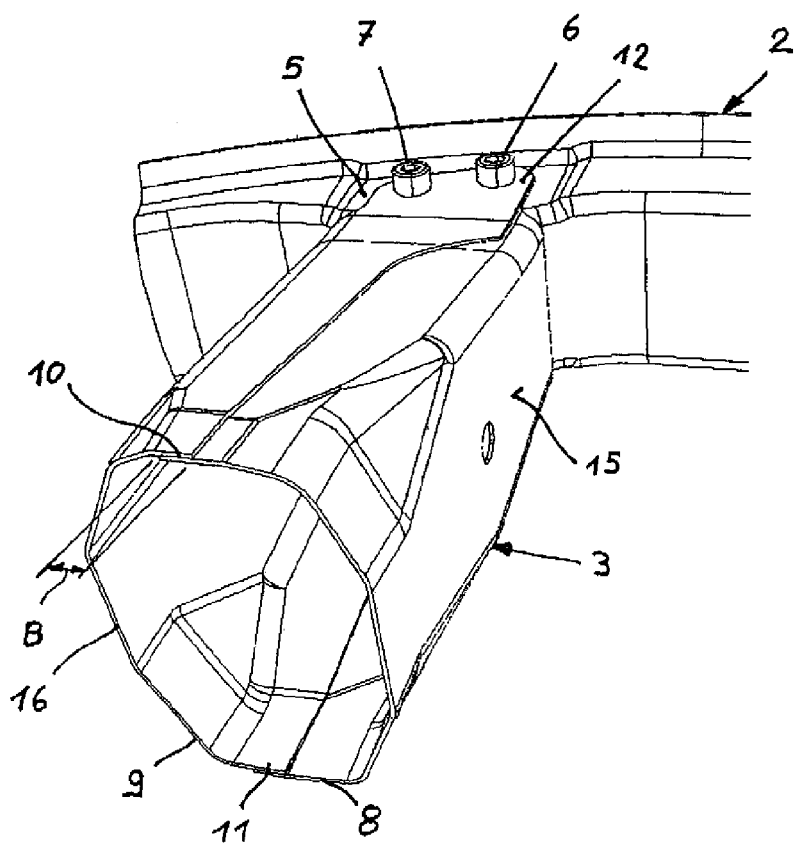
FIG. 2 is a top, side and rear perspective illustration of a crash box.
Figure 3:
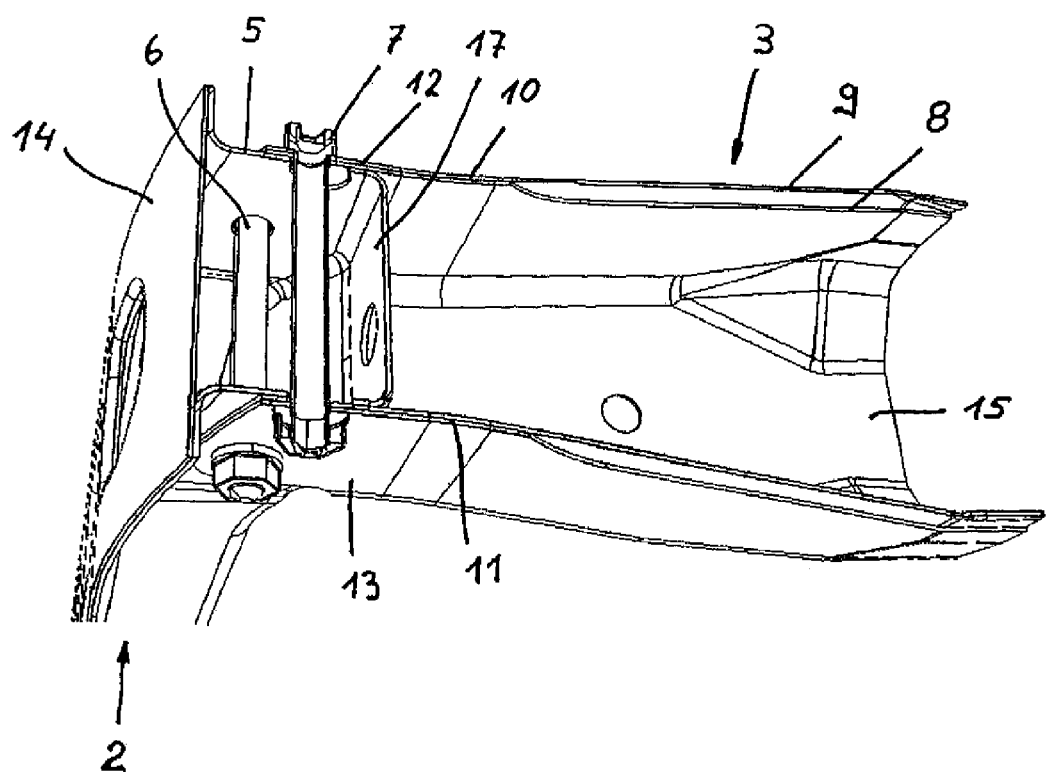
FIG. 3 is a vertical longitudinal section of the crash box of FIG. 2 in perspective illustration.

As shown in FIGS. 1 to 3, the cross member 2 is connected at attachment zones 5 to the crash boxes 3 by means of bolted connections, whereby each bolted connection for securement to the respective crash box 3 includes two bolts 6, 7 which extend in upright direction of the vehicle. The upright direction of the vehicle corresponds in this case to the vertical with respect to the drawing plane of FIG. 1. The bolts 6, 7 are arranged adjacent to one another transversely to a travel direction of the vehicle. With respect to a longitudinal center axis M of the vehicle, the proximal (inner) bolt 6 is positioned slightly forward in relation to the distal (outer) bolt 7 as viewed in the travel direction of the vehicle. Although FIGS. 1-3 show each bolted connection including two bolts 6, 7 for securing the cross member 2 to the crash boxes, the provision of a single bolt is, of course, also conceivable.

For convenience and sake of simplicity, much of the following description is made only in relation to the crash box 3 on the left hand side of the cross member 2, as the two crash boxes are mirror images of one another about the center axis M which bisects the left from the right of the cross member 2. Thus, although the bumper structure 1 will be described with respect to only the left side of the cross member 2, it will be understood that the same components of the bumper structure 1 are duplicated on the opposite side of the cross member 2.

FIG. 2 shows a perspective view of the crash box 3, and it can be seen that the crash box 3 is composed of two sheet-metal shells 8, 9 which form a hollow body. The shells 8, 9 overlap in overlap zones 10, 11, which extends vertically above one another, and are welded together along the straight line G, shown in FIG. 1. In the exemplary embodiment of FIG. 1, the straight line G extends between the two bolts 6, 7, with the inner bolt 6 positioned on one side of the straight line G and with the outer bolt 7 positioned on the other side of the straight line G.

The straight line G extends over the entire length of the crash box 3. In other words, the straight line G spans the area that is configured as hollow body as well as the flanges 12, 13 which continue the hollow body to the cross member 2 and are disposed in vertically opposite relationship and which are configured by a complete overlap of the shells 8, 9. This is best shown in FIG. 3 which also clearly illustrates that the bolts 6, 7 fully traverse the overlap zones 10, 11 and the flanges 12, 13, which are components of the overlap zones 10, 11, as well as the attachment zone 5 of the cross member 2.

The bolts 6, 7 are constructed as screw bolts which press the flanges 12, 13 from atop and from below against the attachment zone 5. Clamping forces of the bolted connection are resisted by the box-shaped profiled cross member 2 which is constructed as a U shaped profile closed by a cover plate 14.

The support of the cross member 2 upon the crash box 3 is established, on one hand, by the bolts 6, 7 and, on the other hand, by sidewalls 15, 16 which come into contact as the U shaped profile 17 of the cross member 2 is upended.

Referring again to FIG. 2, it can be seen that the overlap zones 10, 11 have a width B which, as measured transversely to the travel direction of the vehicle, varies in longitudinal direction of the crash box 3. The width B increases in the direction of the cross member 2, i.e. in the direction of the flanges 12, 13, where the width B reaches a maximum. In the exemplary embodiment, shown here, the width B remains constant and relatively small along a length section 18 (FIG. 1) adjacent to the side rail 4. The length section 18 is continued by a transition 19 where the width B increases up to the maximum width of the flanges 12, 13, where the width B remains again constant. The transition 19 is shorter in length than the length section 18. In the non-limiting example of FIGS. 1-3, the length section 18 is about three times longer than the transition 19.

The change in width B in the transition 19 is not sudden but gradually or continuously. The side of each overlap zone 10, 11 in facing relationship to the center axis M of the vehicle is curved concavely in the transition 19 so that this side reaches the maximum width of the flanges 12, 13 within a shorter distance than the center-axis-distal outer edge of the overlap zone 10, 11. As shown in FIG. 1, the course of the outer edge of each overlap zone 10, 11 is initially curved concavely and then curved convexly until reaching the maximum width at the end of the hollow body. As a result, the overlap zones 10, 11 have each an outline resembling a spoon, with the length section 18 forming the shaft whose width B increases in the transition 19 and which terminates in the flange 12, 13 which represents the bowl portion in this comparison.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper structure for the front and rear area of a motor vehicle, comprising:
   a bumper cross member;
   a crash box placed between the cross member and an end of a side rail, said crash box configured in the form of a hollow body made of two sheet-metal shells overlapping one another in an overlap zone and interconnected, at least in sections thereof, through material union; and
   a bolted connection for detachably securing the cross member to the crash box, said bolted connection having at least one bolt which extends in upright direction of the motor vehicle and is arranged in the overlap zone of the crash box.

2. The bumper structure of claim 1, wherein the shells of the crash box overlap one another in two overlap zones which are disposed in opposite relationship, said bolt being sized to extend through the overlap zones.

3. The bumper structure of claim 2, wherein the overlap zones are configured to have opposing flanges which embrace an attachment zone of the cross member.

4. The bumper structure of claim 3, wherein the shells overlap in an area of the flanges.

5. The bumper structure of claim 1, wherein the overlap zone defines a width which is measured transversely to a travel direction of the motor vehicle and increases from the end of the side rail in the direction of the cross member.

6. The bumper structure of claim 5, wherein the width of the overlap zone in an area of the cross member is at least twice the width of the overlap zone in an area of the end of the side rail.

7. The bumper structure of claim 3, wherein the overlap zone has a length section which is disposed adjacent to the side rail and defined by a constant width, and a transition which extends from the length section to the flanges and has a width which continuously increases to a width of the flanges.

8. The bumper structure of claim 7, wherein the length section has a length which is greater than a length of the transition.

9. The bumper structure of claim 1, wherein the shells are connected through material union from end to end along a straight line which extends in longitudinal direction of the crash box.

10. The bumper structure of claim 9, wherein the bolted connection has two bolts, wherein the overlap zones are configured in the form of opposing flanges which embrace an attachment zone of the cross member, wherein the straight line extends up to the flanges and extends in an area of the flanges between the bolts disposed in spaced-apart relationship so that one bolt is positioned on one side of the straight line and the other bolt is positioned on the other side of the straight line.

11. The bumper structure of claim 1, wherein the shells are connected through material union intermittently along a straight line which extends in longitudinal direction of the crash box.

12. The bumper structure of claim 11, wherein the bolted connection has two bolts, wherein the overlap zones are configured in the form of opposing flanges which embrace an attachment zone of the cross member, wherein the straight line extends up to the flanges and extends in an area of the flanges between the bolts disposed in spaced-apart relationship so that one bolt is positioned on one side of the straight line and the other bolt is positioned on the other side of the straight line.

13. The bumper structure of claim 1, wherein the bolted connection has two bolts in spaced-apart disposition as viewed in travel direction of the vehicle.

14. The bumper structure of claim 7, wherein the cross member defines a center axis, said transition having a center-axis-proximal edge which is curved concavely, and center-axis-distal edge which is initially curved concavely and then curved convexly.

* * * * *

UNITED STATES PATENT AND TRADEMARK OFFICE
CERTIFICATE OF CORRECTION

| | |
|---|---|
| PATENT NO. | : 7,290,811 B1 |
| APPLICATION NO. | : 11/689071 |
| DATED | : November 6, 2007 |
| INVENTOR(S) | : Wilhelm Arns |

It is certified that error appears in the above-identified patent and that said Letters Patent is hereby corrected as shown below:

On The Title Page

Item [30] Foreign Application Priority Data

Correct the Priority Date to --March 21, 2006--

Signed and Sealed this

Sixth Day of May, 2008

JON W. DUDAS
*Director of the United States Patent and Trademark Office*